United States Patent [19]

Sunada et al.

[11] Patent Number: 5,572,533
[45] Date of Patent: Nov. 5, 1996

[54] METHOD AND APPARATUS FOR MONITORING AND FAULT-ANALYZING NETWORKS

[75] Inventors: Kazuhiro Sunada; Yutaka Yamada; Ken Hattori; Katsushi Sakurane, all of Kawasaki, Japan

[73] Assignee: Fujitsu Limited, Kanagawa, Japan

[21] Appl. No.: 496,207

[22] Filed: Jun. 28, 1995

[30] Foreign Application Priority Data

Oct. 14, 1994 [JP] Japan .................................. 6-248987

[51] Int. Cl.⁶ .................................................. G06F 11/00
[52] U.S. Cl. ........................................ 371/20.1; 370/85.13
[58] Field of Search .................................. 371/20.1, 20.5, 371/11.2, 68.2, 48, 61; 395/183.15; 370/13, 14, 15, 85.13

[56] References Cited

U.S. PATENT DOCUMENTS

| | | | |
|---|---|---|---|
| 4,949,246 | 8/1990 | O'Dell et al. | 395/307 |
| 5,197,062 | 3/1993 | Picklesimer | 370/13 |
| 5,414,712 | 5/1995 | Kaplan et al. | 371/20.1 |

*Primary Examiner*—Robert W. Beausoliel, Jr.
*Assistant Examiner*—Phung My Chung

[57] ABSTRACT

A method and an apparatus for monitoring and fault-analyzing a network which includes a plurality of LANs. LAN-to-LAN connectors are provided between LANs. The apparatus includes a monitor fault analyzer. A terminal is connected to a LAN, to issue a command which stores specific packets or transfers stored packets, from a command transmitter to LAN-to-LAN connectors. Upon receiving a command, a command holder of a routing unit (router) of the LAN-to-LAN connector holds the command. The router carries out the usual routing process to pass or block packets transferred from the LAN interfaces according to the addressee. A unit for detecting and copying the specified packets compares the address of each received packet with the addresses stored in the command holder, and if they agree with each other, copies the packet. A data storage unit stores the copy in the storage unit and the time of reception of the packet is measured by the timer and added to the packet. The apparatus monitors and analyzes the contents and time of the collected packets having the addresses of the monitored terminals.

6 Claims, 10 Drawing Sheets

■: ROUTING (BRIDGING) UNIT

Fig. 3 PRIOR ART

BRANCHING UNIT IS USUALLY INSERTED IN THIS WAY TO MONITOR DATA.

METHOD AND APPARATUS FOR MONITORING AND FAULT-ANALYZING NETWORKS

BACKGROUND OF THE INVENTION

1. Field of the Invention

The present invention relates to a method of, and an apparatus for, monitoring and fault-analyzing a network of LANs.

2. Description of the Prior Art

LANs (local area networks) are rapidly spreading among businesses. The LANs in offices and buildings are connected to one another through, for example, WANs (wide area networks), to share resources. To connect LANs and WANs to one another, LAN-to-LAN connectors each having a bridge, a router, and a bridge-router are employed to provide filtering, forwarding, and routing functions to deal with different protocols of different kinds of LANs.

If a data transfer fault occurs between specific terminals of different LANs in a network of LANs, the fault must be analyzed. In this case, packet analyzers are installed in paths of the LANs. Permanently installing these analyzers involves high costs, and arranging the analyzers whenever a fault occurs is physically difficult. It is required, therefore, to provide a technique for analyzing a fault at low cost.

A LAN-to-LAN connector usually has a bridge that connects different LANs to each other and checks the source and destination addresses of a packet in a data link layer to see whether the packet must be transferred or abandoned, a router that checks the header of a packet in a network layer to see whether or not the packet must be sent to another network, and if it must be sent to another network, finds an optimum route for passing the packet, and a bridge-router that has both the functions of the bridge and router. If a packet collision or error occurs in a transmission path between LANs, the LAN-to-LAN connector stores information related to the fault and transfers the information to an exclusive monitor manager or an SNMP (single network management protocol) manager, which statistically manages such information of the LANs. This system is incapable of monitoring communication between specific terminals in LANs.

A prior art will be explained with reference to FIGS. 1 to 5.

Figure 1:
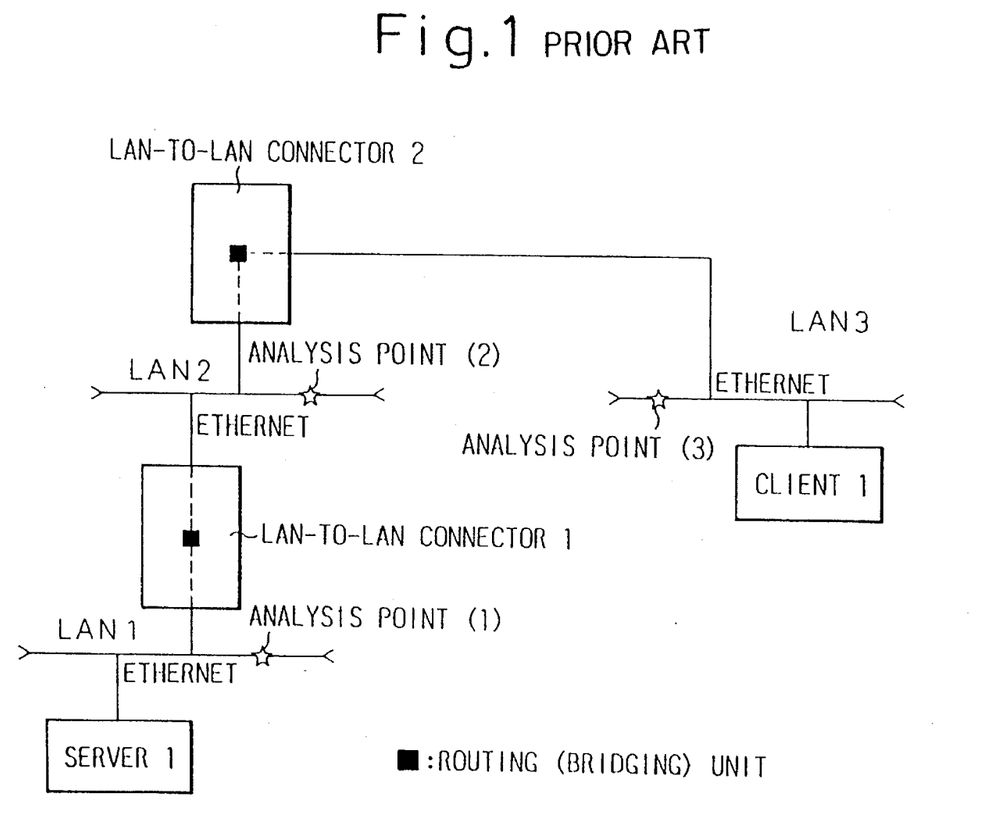
FIG. 1 is a schematic view showing a network of LANs according to a prior art.
Figure 2:
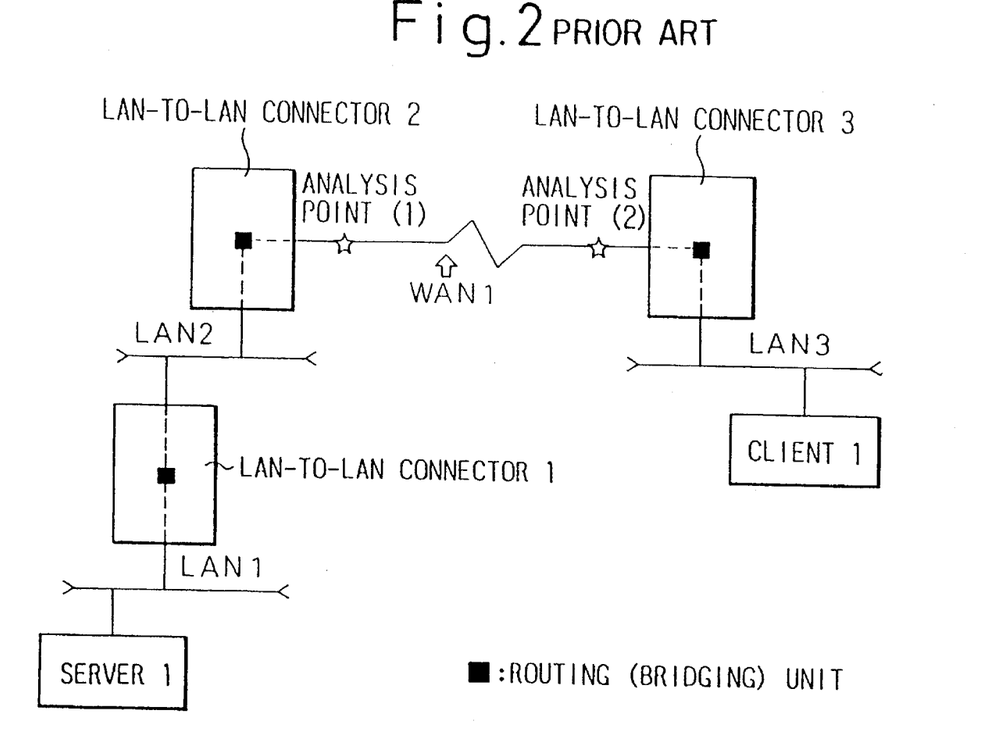
FIG. 2 is a schematic view showing a network including a wide area network (WAN) according to a prior art.

FIG. 1 shows a network of LANs according to the prior art, and FIG. 2 shows a network involving a WAN (wide area network).

In FIG. 1, the LANs 1 to 3 are based on the Ethernet technology. A LAN-to-LAN connector 1 is arranged between the LANs 1 and 2, and a LAN-to-LAN connector 2 between the LANs 2 and 3. The network of FIG. 2 includes LANs 1 to 3 and the WAN 1. A LAN-to-LAN connector 1 is arranged between the LANs 1 and 2, a LAN-to-LAN connector 2 between the LAN 2 and the WAN 1, and a LAN-to-LAN connector 3 between the WAN 1 and the LAN 3.

Figure 3:
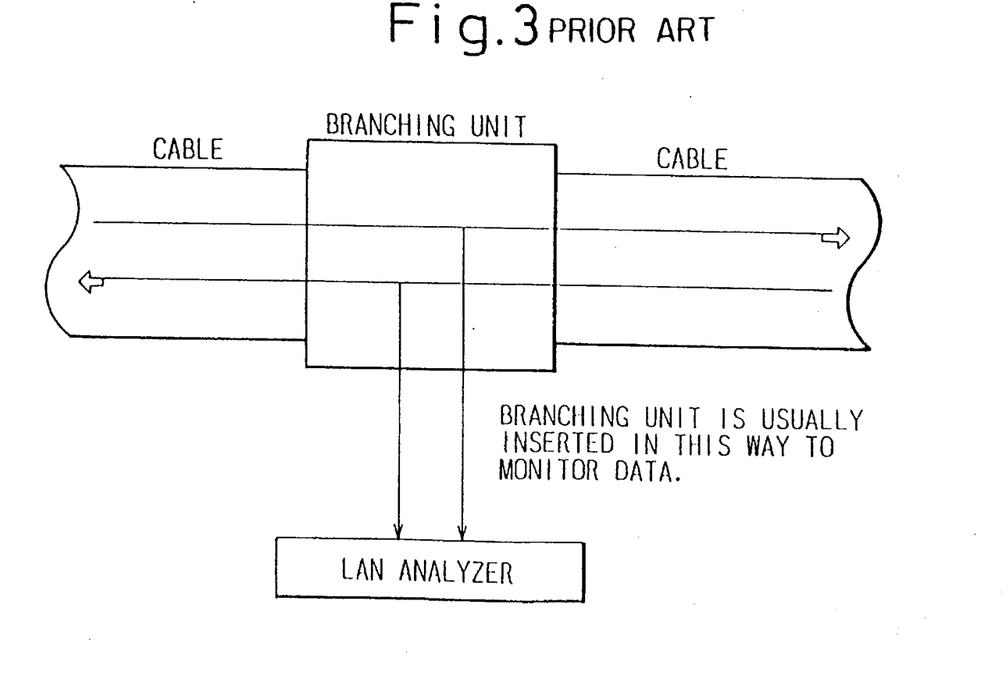
FIG. 3 shows a method of inserting a LAN analyzer according to a prior art.
Figure 4:
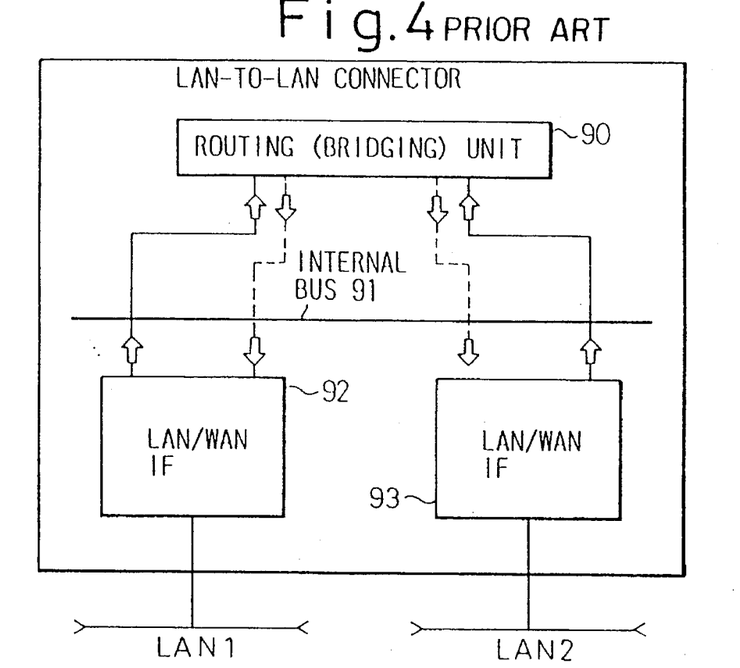
FIG. 4 is a schematic view showing a LAN-to-LAN connector according to a prior art.
Figure 5:
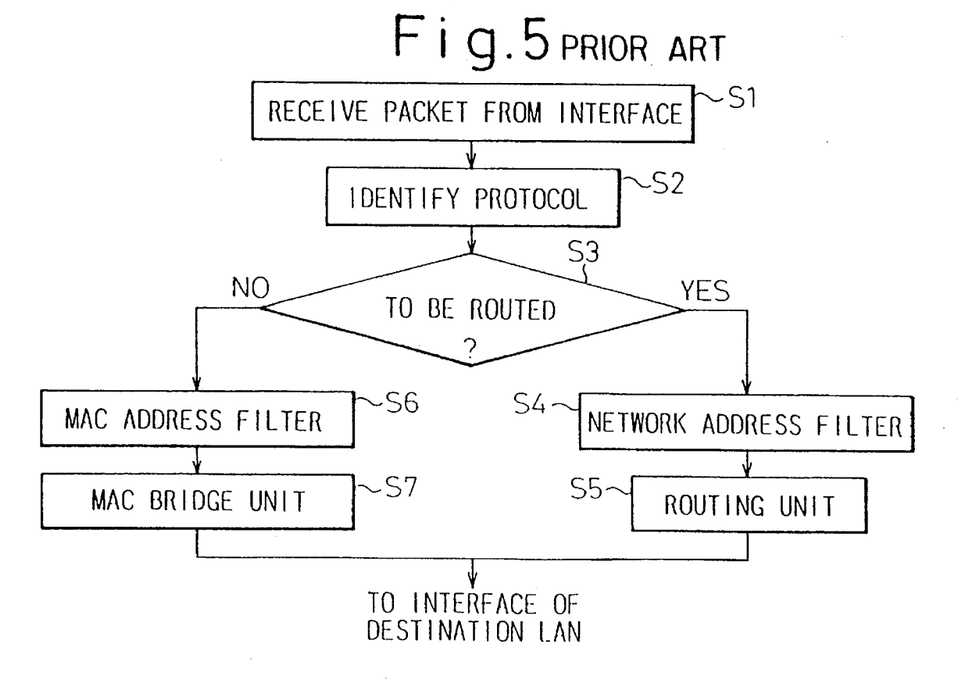
FIG. 5 shows a process flow of the LAN-to-LAN connector prior art.

FIG. 3 shows a method of inserting a LAN analyzer, FIG. 4 shows one of the LAN-to-LAN connectors of FIGS. 1 and 2, and FIG. 5 shows a flow of steps carried out by the LAN-to-LAN connector. These figures will be explained in detail.

The LAN-to-LAN connector of FIG. 4 may connect the LANs 1 and 2 to each other. The connector has a router (bridge) 90, an internal bus 91, and LAN/WAN interfaces 92 and 93. The LAN/WAN interface 92 is connected to the LAN 1, and the LAN/WAN interface 93 to the LAN 2.

The LAN/WAN interface receives a packet from a transmission path of the LAN or WAN and transfers the packet to the router. The router processes the packet according to the flow of FIG. 5 and transfers the packet to the LAN/WAN interface that is connected to a destination transmission path.

The process flow of the router will be explained with reference to FIG. 5. Step S1 receives a packet from the LAN/WAN interface. Step S2 identifies a protocol of the packet, and step S3 determines whether or not the packet must be routed. Namely, if the packet has an MAC (media access control) address plus an IP address, the packet involves a TCP/IP and must be routed, and if it has only an MAC address, it involves a protocol specific to a manufacturer and must not be routed.

If the packet must be routed, a routing process is carried out. In step S4, a network address filter (not shown) filters out a network address. Namely, if the packet has a predetermined network address, the packet is passed, and if not, it is blocked. If the packet is passed, step S5 looks up a routing table (not shown) and adds the packet to a network router.

When the packet has a protocol not to be routed, an MAC address filter checks the MAC address of the packet. If the MAC address must be blocked, step S6 blocks the packet, and an MAC bridge forwards the packet onto the following LAN in step S7.

In the network of FIG. 1 or 2 having the LAN-to-LAN connectors each having the functions of FIG. 5, a communication interrupt fault may occur between, for example, a server 1 connected to the LAN 1 and a client 1 connected to the LAN 3. Then, a fault analyzer such as a LAN analyzer is used to monitor the terminal address such as the MAC or IP address of each packet transferred through transmission paths of the LANs, and if necessary, examine the protocol of the packet.

In FIG. 1, the LAN analyzers must be connected to analysis points (1) to (3) of the LANs 1 to 3, respectively. In FIG. 2, the LAN analyzers must be connected to an analysis point (1) between the LAN-to-LAN connector 2 and the WAN 1 and an analysis point (2) between the WAN 1 and the LAN-to-LAN connector 3, respectively.

FIG. 3 shows a method of inserting the LAN analyzer. A branching unit must be arranged in a transmission path, to branch packets into the LAN analyzer and monitor and analyze the packets.

The LAN analyzers are expensive. Permanently arranging the LAN analyzers in transmission paths of LANs, which are presently very complicated, involves great costs. Accordingly, it is preferable to simultaneously measure, as soon as a communication interrupt fault occurs between, for example, the server 1 and the client 1, all LANs that pass packets between the server 1 and client 1.

It is impossible, however, to arrange the LAN analyzers at a plurality of locations as soon as a fault occurs. Accordingly, the prior art employs one LAN analyzer to check the paths of the LANs one by one. This technique takes a long time to complete. In FIG. 1 for example, the LAN analyzer is connected to the analysis points (1) to (3) one after another, to monitor packets.

When data must be transferred to a distant place through the LAN-to-LAN connectors and WAN as shown in FIG. 2, the LAN analyzer must be connected to the branching unit of FIG. 3 having a physical WAN interface to fetch data. A physical layer of the WAN covers a variety of interfaces such as CCITT V-series interfaces including V. 35 and V. 24/28, CCITT X-series interfaces including X. 21, ISDN interfaces including I. 430, and high-speed digital interfaces. Also, a data link layer of the WAN involves many protocols such as modifications of HDLC specific to vendors, although they will be standardized into the PPP of TCP/IP.

The WAN of FIG. 2 may employ a high-speed LAN using an FDDI (fiber distributed data interface). In this case, the LAN analyzer connected to an analysis point of the high-speed LAN must have an interface proper for the high-speed LAN. In this way, there are many physical interfaces.

When analyzing data transferred through the WAN and high-speed LAN, it is necessary to prepare branching units having connectors for different physical layers including optical fibers, coaxial cables, and twisted pair cables. At the same time, the LAN analyzers must have such physical interfaces. In addition, there are many kinds of data frames, i.e., data link layers transferred among the LAN-to-LAN connectors depending on vendors, to hinder analysis. High-speed LANs such as FDDIs require specific interfaces.

Figure 6:
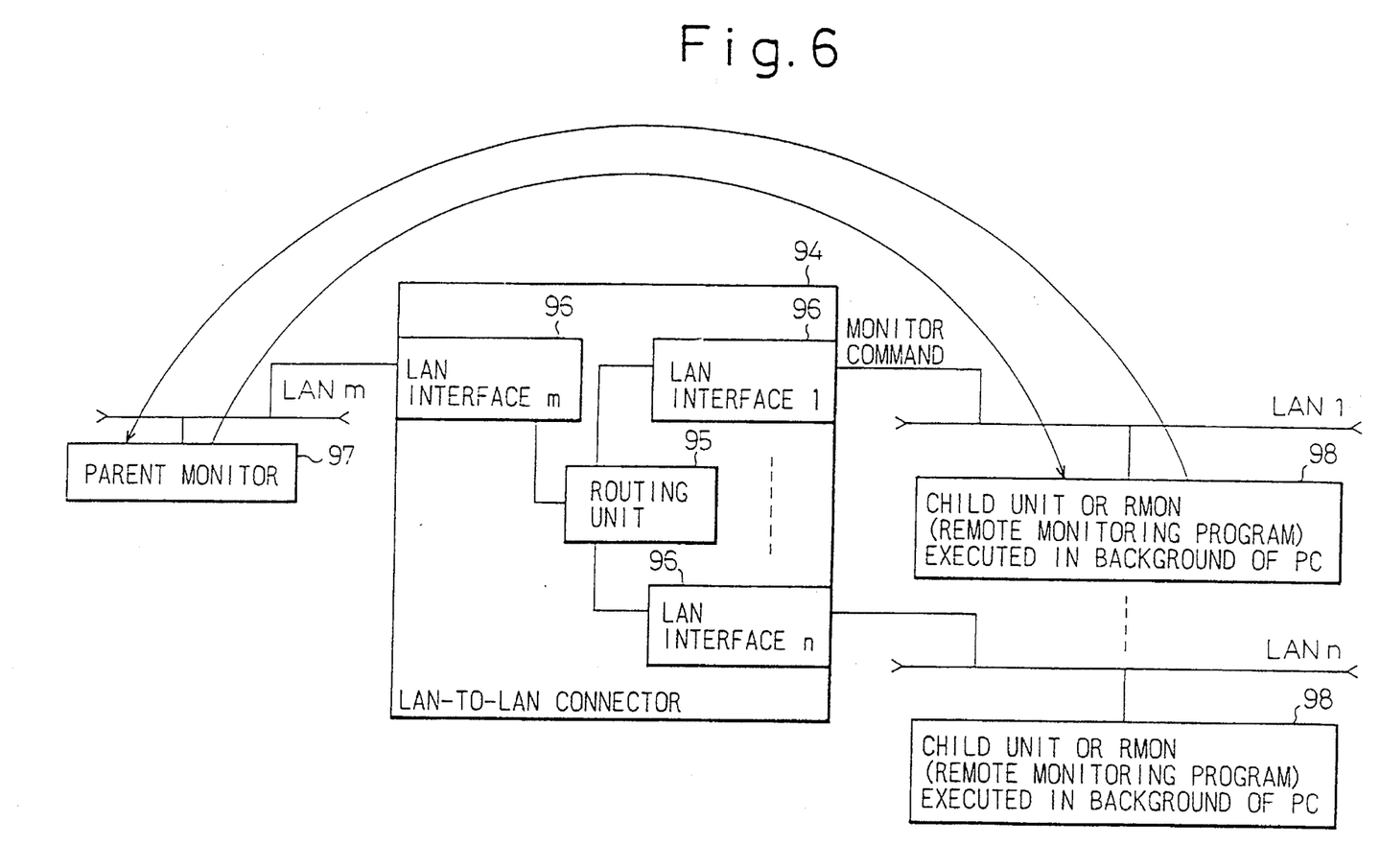
FIG. 6 explains a method of monitoring and analyzing LANs, employing a parent unit and child units.

FIG. 6 explains a method of monitoring and analyzing a LAN, employing a parent monitor and child units. A LAN-to-LAN connector 94 has LAN interfaces 96 (from 1 to n) connected to LANs 1 to n, respectively. This connector has a router 95 for carrying out a routing (bridging) process. Among the LANs, the LAN m is provided with the parent monitor 97. The other LANs are each provided with the child unit 98, which may be a separate device or a program such as a remote monitoring program (RMON) executed, in the background, on a personal computer. In response to a command from the parent monitor 97, each of the child units 98 monitors packets transferred through the respective LANs. The child units 98 send monitored results to the parent unit 97 through the LAN-to-LAN connector 94 in response to a command from the parent monitor 97.

According to the prior art of FIGS. 1 to 5, it is difficult to employ expensive analyzers to monitor LANs at a plurality of analysis points when a fault occurs in the LANs. Accordingly, one LAN analyzer may be employed to monitor the analysis points one after another. This technique is incapable of analyzing a fault that is not recurrent. If a plurality of analyzers are used to simultaneously monitor the analysis points, installation, and preparatory work for, the analyzers will be complicated.

To monitor a network including a WAN, branching units proper for the physical layer of the WAN must be prepared, and the LAN analyzers must also have proper physical interfaces. Even with these facilities, it is hard to analyze data link protocols specific to vendors.

According to the method of monitoring and analyzing LANs with the parent and child units of FIG. 6, each LAN must have the child unit and all of the child units must be always active. Employing the exclusive child units increases costs. Executing a program serving as the child unit in the background of a personal computer (PC) means that the PCs must always be active. When the child units are connected to the WAN, they must deal with various kinds of physical layers and data link layers specific to vendors, similar to the LAN analyzers used for a network including the WAN.

SUMMARY OF THE INVENTION

An object of the present invention is to solve these problems. The present invention provides a method of and an apparatus for analyzing a network of LANs, capable of simultaneously monitoring packets transferred between terminals to be monitored, among packets transferred among the LANs.

Another object of the present invention is to provide a method of and an apparatus for monitoring and fault-analyzing a network of LANs, capable of starting a monitoring operation as soon as a fault occurs and being easily installed in an existing system at low cost.

Figure 7:
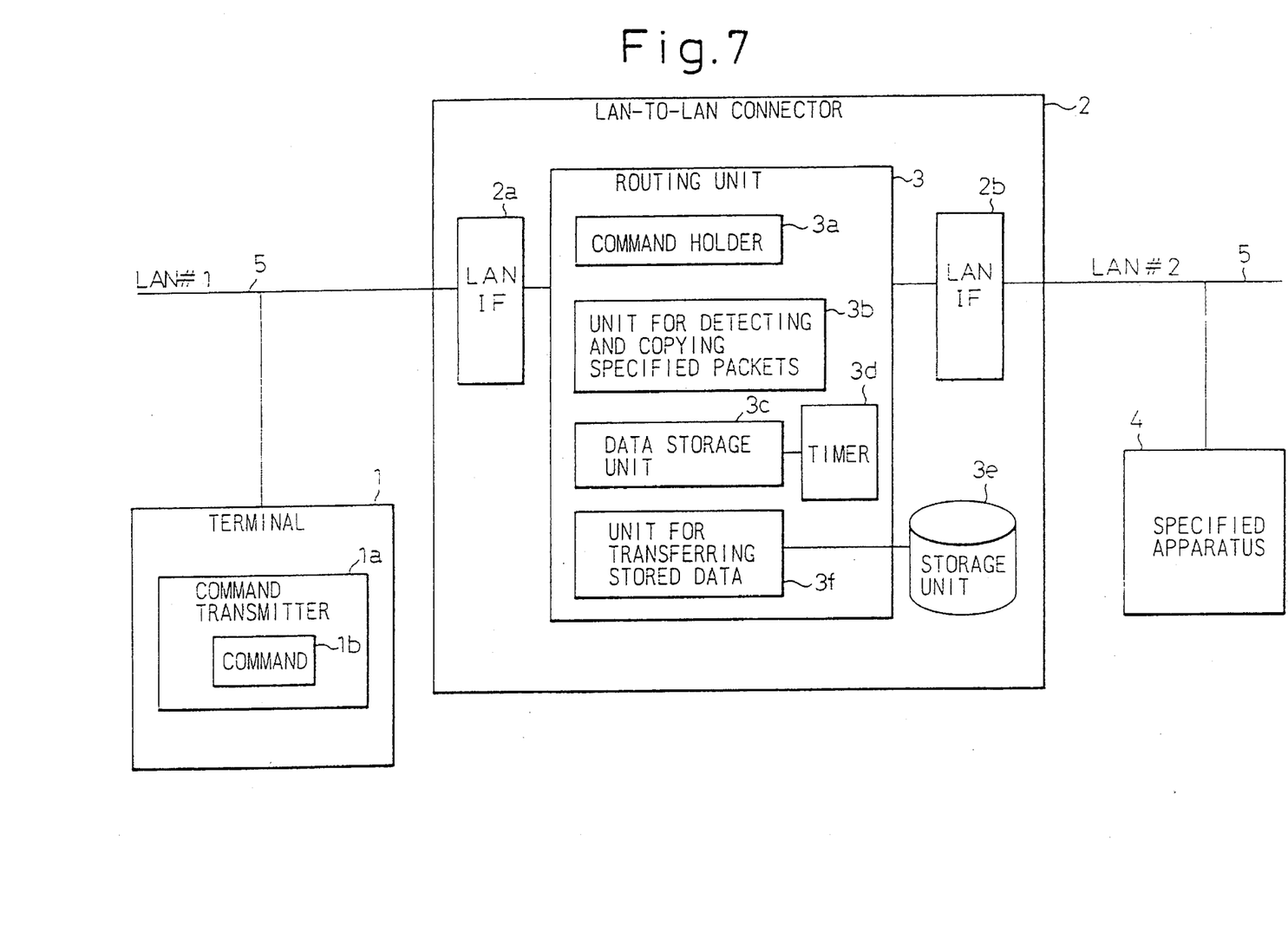
FIG. 7 is a schematic view showing the principle of the present invention.

FIG. 7 shows a principle of the present invention.

In the figure, numeral 1 is a terminal connected to a LAN to issue a command to LAN-to-LAN connectors, 1a is a command transmitter, 1b is a command to store specific packets or transfer stored packets, 2 is a LAN-to-LAN connector, 2a and 2b are LAN interfaces, 3 is a router, 3a is a command holder, 3b is a unit for detecting and copying the specified packets, 3c is a storage unit, 3d is a timer incorporated in a terminal, 3e is a storage unit formed in a part of a memory, 3f is a unit for transferring stored data, 4 is a specified apparatus, which may be a LAN fault analyzer or a LAN monitor, and 5 is a LAN connected to the LAN-to-LAN connector 2. In this example, LANs #1 and #2 are connected to the LAN-to-LAN connector.

The terminal 1 may be a PC (personal computer) connected to the LAN, or the same apparatus as the specified apparatus 4. Although the figure shows only one LAN-to-LAN connector 2, each LAN-to-LAN connector is arranged at a point where different LANs are connected to each other.

The present invention adds, to a conventional LAN-to-LAN connector, functions of copying a packet having a remotely specified address, adding the time of reception of the packet to the packet, storing the packet, and transferring the stored data to a specified LAN monitor, which collects data from LAN-to-LAN connectors.

The command transmitter 1a of the terminal 1 connected to an optional one of the LANs of FIG. 7 sends the command 1b to the LAN-to-LAN connectors. The command 1b instructs the connectors to store packets having the addresses of terminals that have caused a communication fault and must be monitored and to transfer the stored packets to the specified apparatus. The command is received by the LAN-to-LAN connector 2 and transferred to the other LAN-to-LAN connectors.

Upon receiving the command, the command holder 3a of the router 3 of the LAN-to-LAN connector 2 holds the command. Thereafter, the router 3 carries out the usual routing process to pass or block packets transferred from the LAN interfaces 2a and 2b according to the addresses such as MAC addresses and IP addresses of the packets. The unit 3b for detecting and copying the specified packets compares the address of each received packet with the addresses stored in the command holder 3a, and if they agree with each other, copies the packet. The data storage unit 3c stores the copy in the storage unit 3e. At this time, the time of reception of the packet is measured by the timer 3d and added to the packet.

In this way, corresponding packets and their time of reception are successively stored in the storage unit 3e. Whenever a predetermined time elapses, a predetermined number of packets are stored, or specified time arrives, the transfer unit 3f transfers the data in the storage unit 3e to the specified apparatus 4 whose address is stored in the command holder 3a.

The specified apparatus 4 collects the packets with temporal information from the LAN-to-LAN connectors. The specified apparatus 4 monitors and analyzes the contents and time of the collected packets having the addresses of the monitored terminals.

The router for copying a packet is irrelevant to physical interfaces of the LANs. Accordingly, it is easy to monitor packets passed through WANs and high-speed LANs such as FDDIs. The present invention adds the new functions only to the router of each LAN-to-LAN connector, so that the number of apparatuses to which the new functions are added is smaller than the number of LANs to be monitored. This results in reducing costs compared with the prior art that monitors LANs with respective LAN monitors.

DESCRIPTION OF THE PREFERRED EMBODIMENTS

Figure 8:
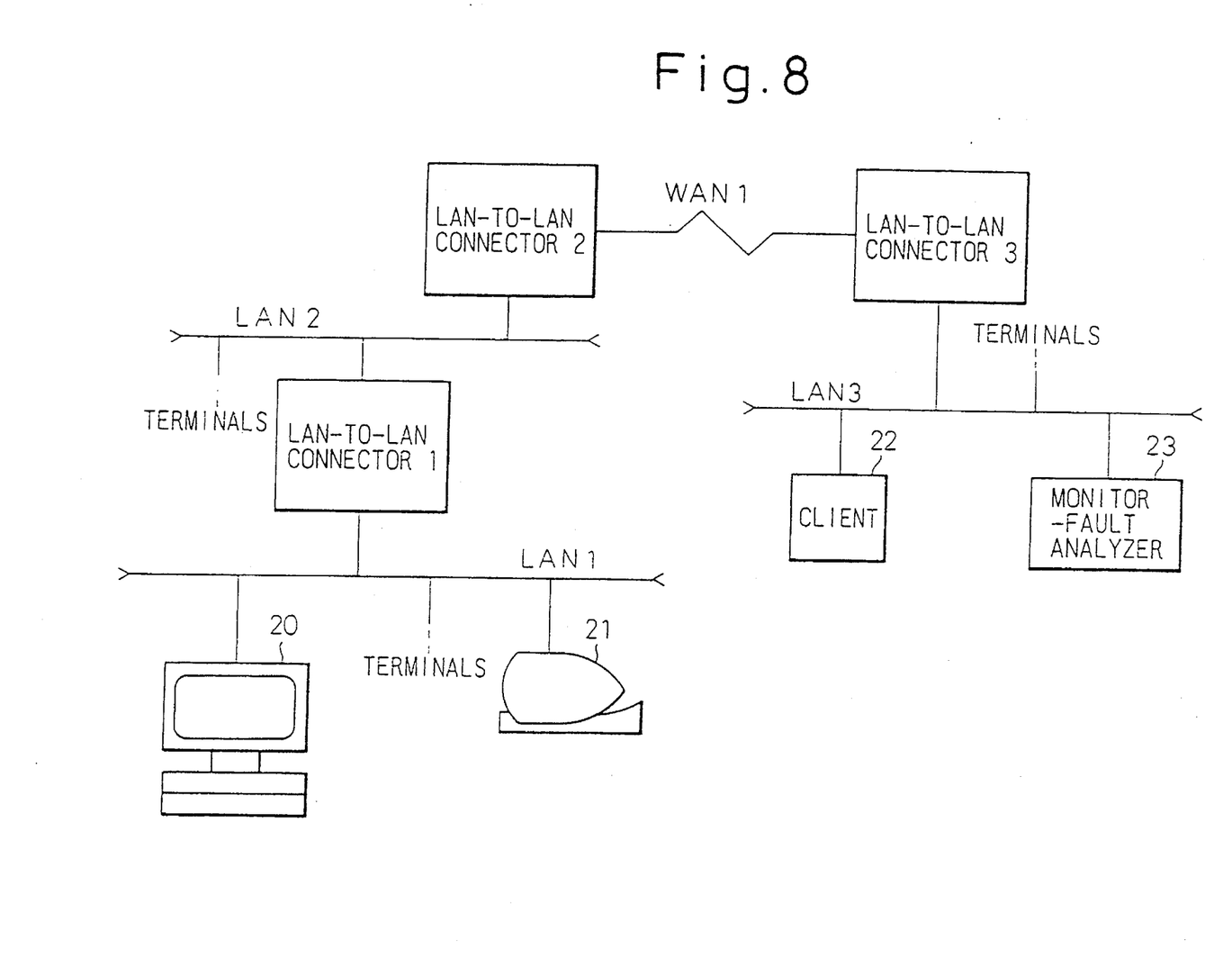
FIG. 8 shows a network to which the present invention is applied.

FIG. 8 shows a network to which the present invention is applied.

Similar to FIG. 2, this network consists of LANs 1 to 3 and a WAN (wide area network) 1. LAN-to-LAN connectors 1 to 3 are arranged among the LANs and WAN as shown in the figure. Numeral 20 is a server connected to the LAN 1, 21 is a terminal or a personal computer connected to the LAN 1, 22 is a client connected to the LAN 3, 23 is an apparatus for monitoring and fault-analyzing the LANs. Each of the LANs is connected to terminals, personal computers, workstations, etc., (not shown). The monitor analyzer 23 may be a LAN analyzer that receives data from the LAN-to-LAN connectors, displays the data, analyzes the data, and displays a result of the analysis.

If a fault such as a communication interruption occurs between terminals in the network, for example, between the server 20 of the LAN 1 and the client 22 of the LAN 3, an operator of the terminal 21 of the LAN 1 issues a command to the LAN-to-LAN connectors, to copy packets having a specified address. The command to the LAN-to-LAN connectors may be issued from the monitor analyzer 23.

There is arranged a man-machine interface for issuing commands to the LAN-to-LAN connectors, to copy packets having the specified address.

Figure 9:
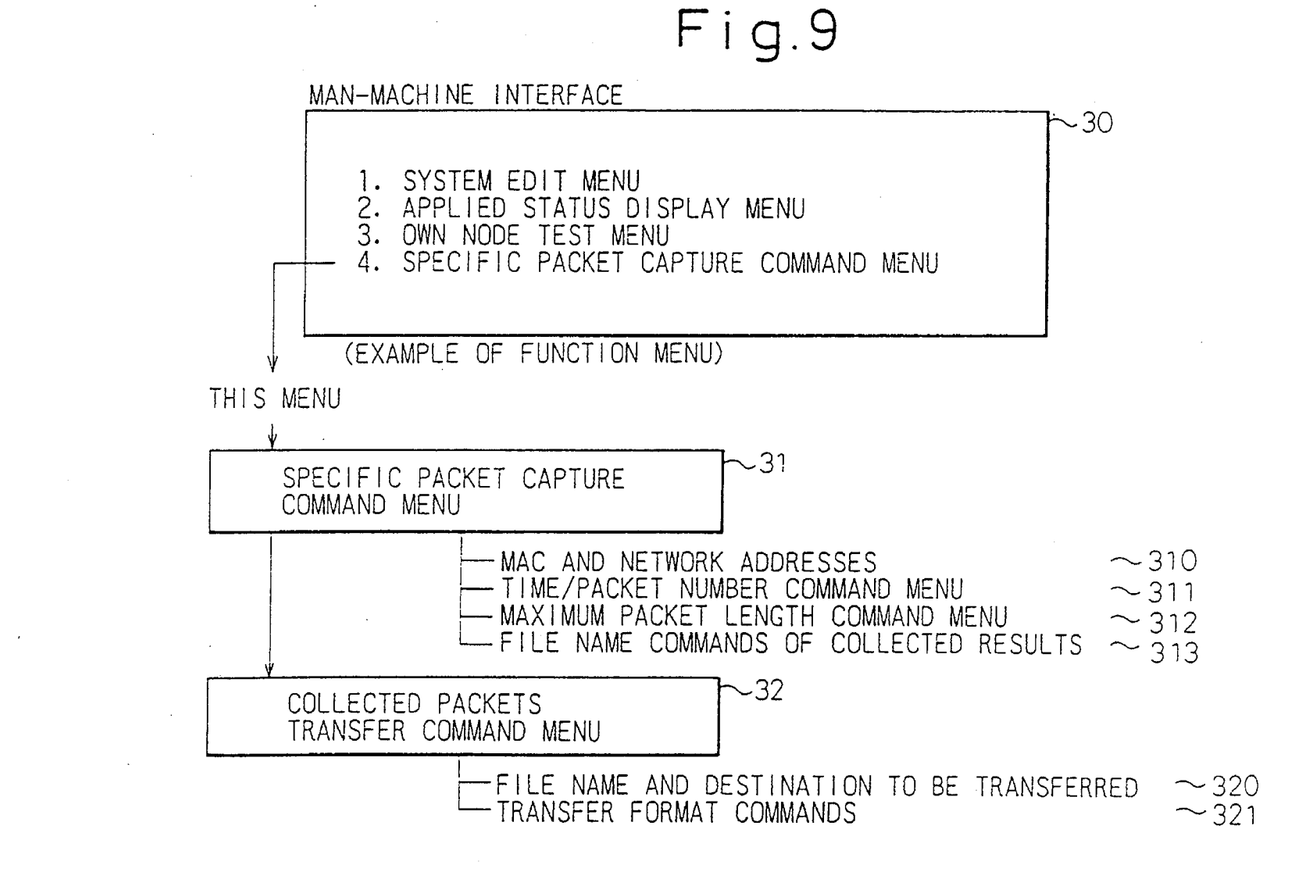
FIG. 9 explains a man-machine interface for entering commands to LAN-to-LAN connectors.

FIG. 9 explains the man-machine interface to issue commands to the LAN-to-LAN connectors. Generally, a LAN-to-LAN connector has a control mechanism that is interactively manipulated through a terminal of a LAN with a virtual terminal function, e.g., TELNET of the TCP/IP, as shown in FIG. 9.

When the terminal 21 or the monitor analyzer 23 issues a command to collect specific packets, the LAN-to-LAN connectors follow the command.

FIG. 9 explains the interactive man-machine interface. Numeral 30 is an example of a function menu. This menu is first displayed at the terminal 21 (FIG. 8) when a command to the LAN-to-LAN connectors is issued. Menus 1 to 3 in the menu 30 are conventional ones that include a system edit menu, a status display menu, and an own node test menu. A menu 4 in the menu 30 is additional to monitor LANs according to the present invention. This menu is to issue a command to capture specific packets.

When selected, the menu 4 in the function menu 30 issues a command to collect specific packets, or a command to transfer collected packets to the monitor analyzer. Once the menu 4 is selected, a menu 31 is first displayed, to issue a command to collect specific packets. This menu includes a menu 310 for entering the MAC and network addresses of a packet to be collected, a menu 311 for entering a collect time and the number of packets to be collected, a menu 312 for entering the maximum length of the packet to be collected, and a menu 313 for entering a file name for storing collected data. Data may be entered for each of the menus, or predetermined reference values may be used.

Thereafter, a menu 32 is displayed to issue a command to transfer collected packets. This menu includes a menu 320 for specifying the name of a file for storing collected data to be transferred and the address of a destination, which may be a packet collecting terminal or the monitor analyzer, and a menu 321 for specifying a transfer format.

The terminal 21 transmits the commands set through these menus to specified LAN-to-LAN connectors that are considered to relate to a fault, or to all LAN-to-LAN connectors.

Figure 10:
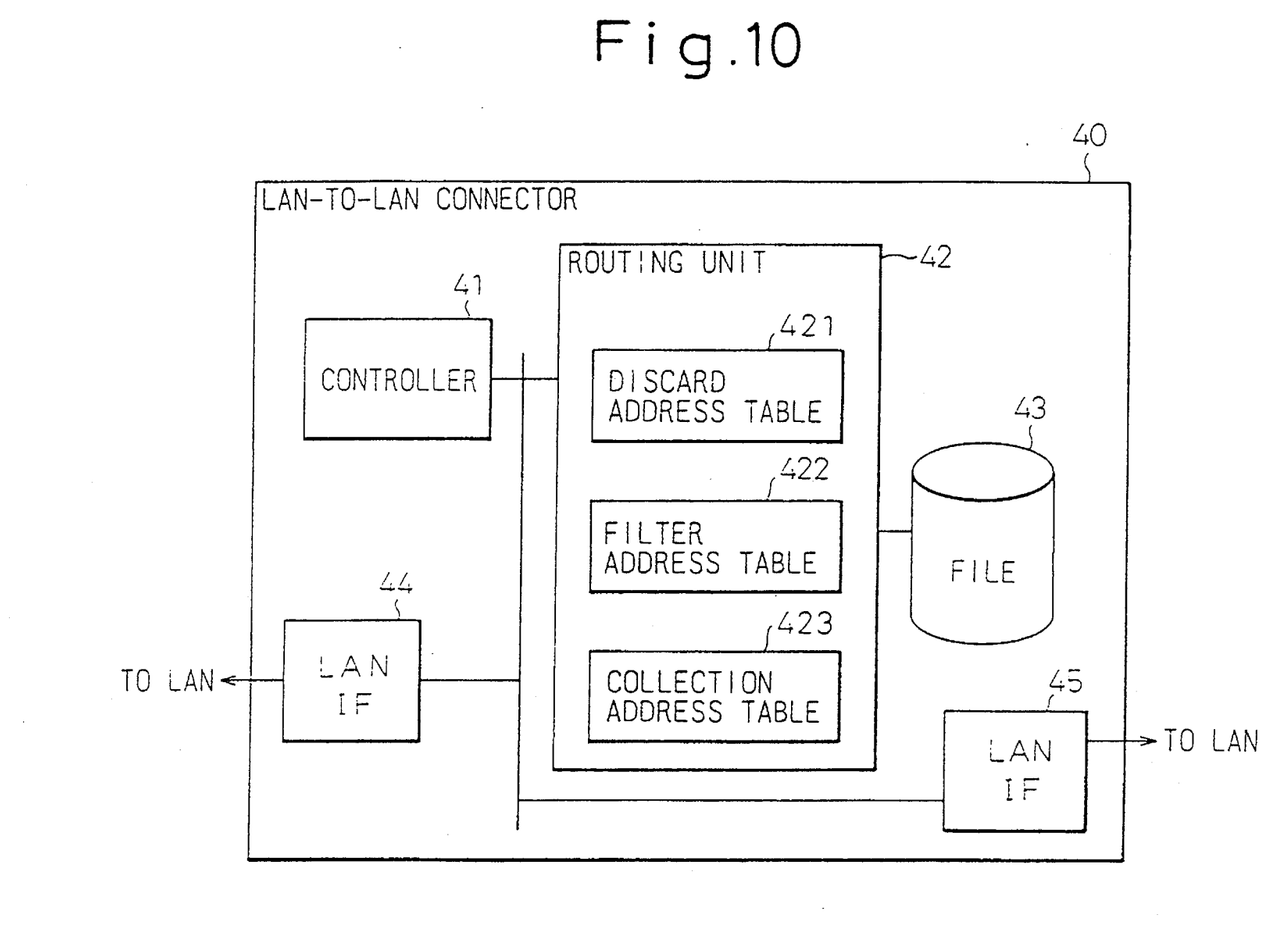
FIG. 10 is a block diagram showing a LAN-to-LAN connector.

FIG. 10 is a block diagram showing the LAN-to-LAN connector in accordance with the present invention. Numeral 40 is the LAN-to-LAN connector, 41 is a controller, 42 is a router having the same functions as those of the prior art of FIG. 5 as well as those of the present invention of collecting and storing specified packets and transferring the stored packets to a specified apparatus, 43 is a file for storing collected packets, and 44 and 45 are LAN (WAN) interfaces connected to LANs and WANs.

The specific packet capture command entered through the menus of FIG. 9 is transmitted to the network. The controller 41 of the LAN-to-LAN connector 40 detects the command and transfers the contents of the command to the router 42. The router 42 stores the terminal address of the packet to be collected in a collection address table 423 in a memory. Collecting conditions and the destination of collected packets are stored in an area (not shown) of the memory. Numeral 421 is a discard address table used to discard (block or abandon) packets, and 422 is a filter address table used to filter packets.

The router 42 of the LAN-to-LAN connector carries out the processes of FIG. 5 of the prior art. Namely, the router 42 receives a packet from the LAN interfaces, reads the MAC and network addresses from a frame of the packet, determines whether or not the packet must be routed, and carries out a routing process if the packet has an MAC address plus an IP address or a bridging process if the packet has only an MAC address. Before this, the filters corresponding to the steps S4 and S6 of FIG. 5 determine if the packet must be passed (filtered) or blocked (discarded).

The present invention provides the two filters with the functions of copying a packet having a specified address, adding the time of reception of the packet to the packet, and storing the packet as a file in the memory of the LAN-to-LAN connector.

Figure 11:
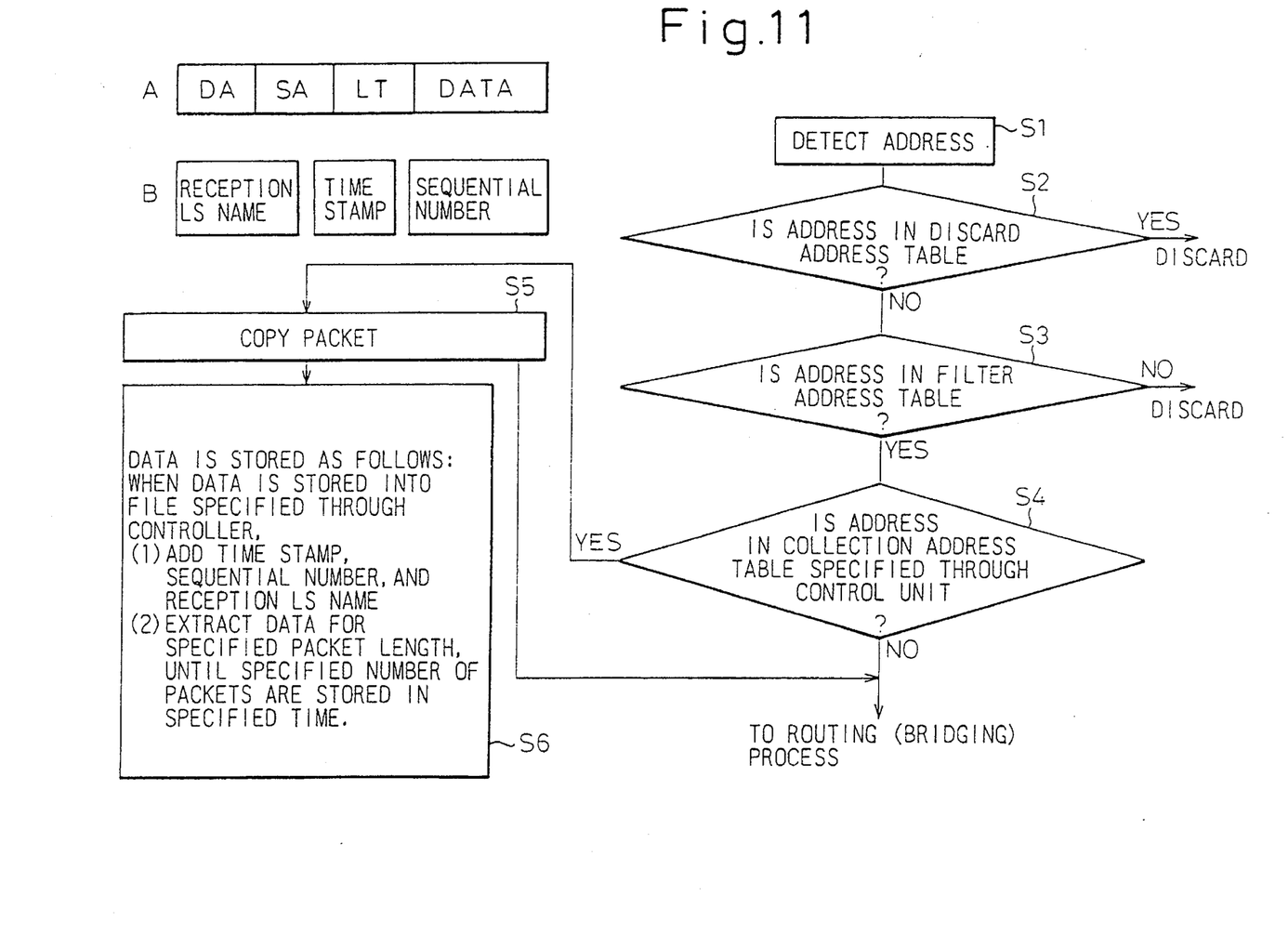
FIG. 11 is a flowchart showing a process carried out by address filters according to the present invention.

FIG. 11 is an explanatory diagram showing a point of flow chart of the steps carried out by the address filters of the present invention of FIG. 11. The address filters may be a MAC address filter and a network address filter.

In step S1, an address detector detects the address of a received packet. A reference mark A in FIG. 11 shows an example of the received packet. The received packet includes a destination address DA, a source address SA, length and type LT, and transmitted data DATA. Step S2 determines whether or not any one of the addresses DA and SA agrees with an address listed in the block (discard) address table. If they agree, the packet is discarded, and if not, step S3 determines whether or not any one of the addresses DA and SA agrees with an address in the filter address table.

If they do not agree, the packet must not be passed, and therefore, it is discarded. If they agree with each other, step S4 determines whether or not one of the addresses agrees with an addresses in the collection address table that stores the addresses of packets to be collected specified in the menu 310 of FIG. 9. If they agree with each other, the packet must be collected, and therefore, it is copied in step S5. If they do not agree, or after the packet is copied, the packet is transferred to the router (S5 of FIG. 5) or the MAC bridge unit (S7 of FIG. 5), to carry out a routing or forwarding process.

After the packet is copied, the controller stores, in step S6, a copy of the packet (A in FIG. 11) in the specified file.

(1) The name of a reception LS (line set), i.e., the name of the interface of the LAN or WAN that has received the packet, the time of reception of the packet, and a sequential number are added to the packet data, as indicated with B in FIG. 11.

(2) The packet is collected up to the maximum packet length specified under the menu 312 of FIG. 9. Copies of packets with additional information are collected and stored up to the number specified under the menu 311 of FIG. 9.

In this way, copies of received packets having the specified terminal address are successively stored in the file. When the specified time elapses, or when the number of collected packets reaches the preset number, the LAN-to-LAN connector transfers the file to the destination specified under the menu 320 of FIG. 9.

Figure 12:
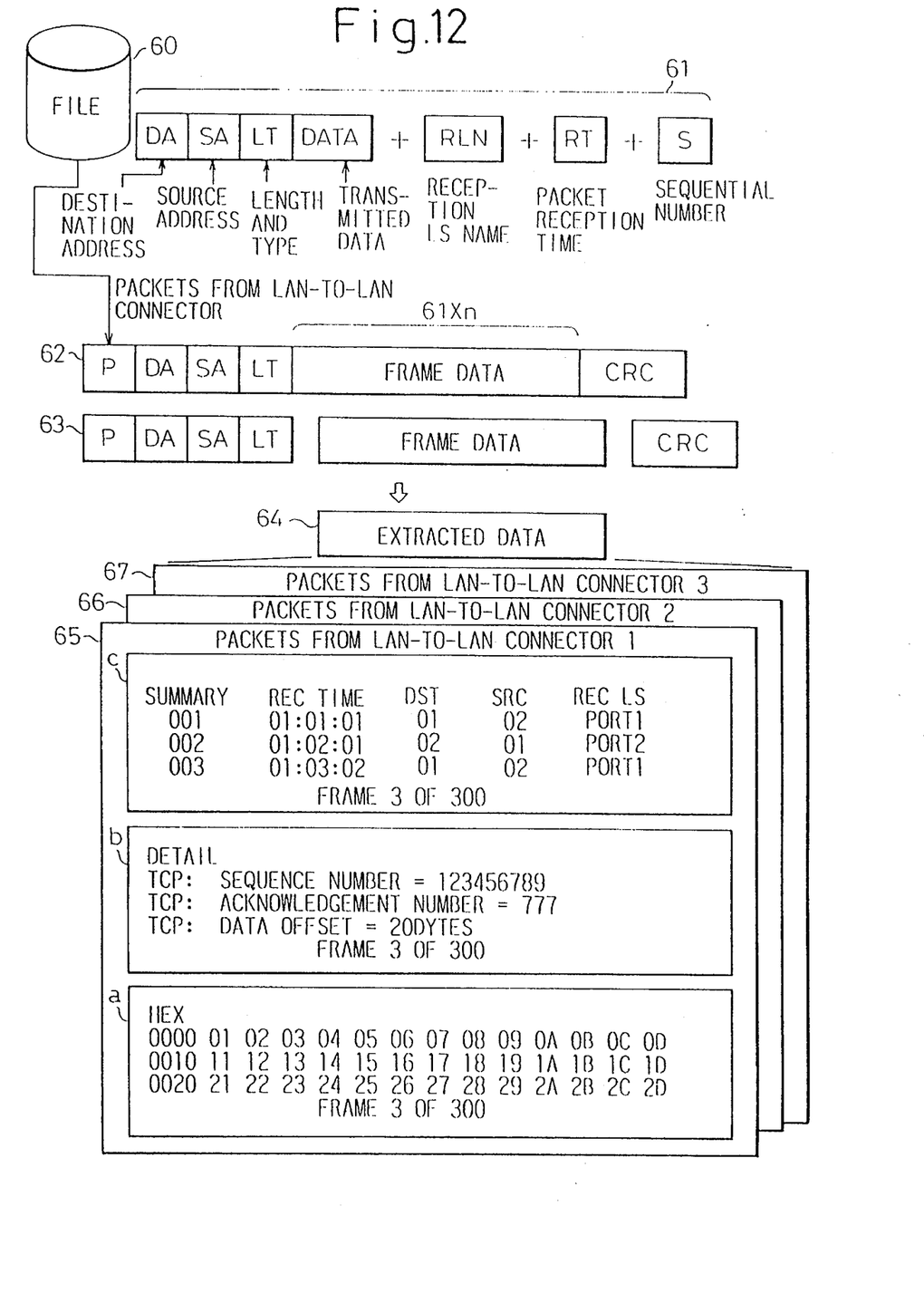
FIG. 12 explains the collection and analysis of data transmitted from LAN-to-LAN connectors.

FIG. 12 explains the collection and analysis of data transmitted from each LAN-to-LAN connector. Numeral 60 is a storage file of each LAN-to-LAN connector for storing copied packets. The storage file 60 stores n pieces of data 61 each including a copied packet consisting of DA, SA, LT, and DATA, a reception LS name, the time of reception of the packet, and a sequential number. When the number of packets reaches the preset number, or when the specified time elapses, the contents of the storage file 60 are transferred to the specified apparatus, e.g., the monitor analyzer 23 of FIG. 8.

The n pieces of data 61 are transferred as frame data provided with P (preamble), DA, SA, and LT added to the head thereof, and CRC (cyclic redundancy check) added to the end thereof.

The monitor analyzer receives the data, removes the overheads added to the heads and ends thereof, and extracts the frame data alone as indicated with 63 in FIG. 12. The extracted data 64 is stored in a file (not shown). The extracted data is identical to the data 61 before transmission and having the packets and added information. Accordingly, they are handled like ordinary packets transmitted among LANs and captured by a LAN analyzer.

Lists 65 to 67 of FIG. 12 indicate packets collected from the LAN-to-LAN connectors 1 to 3 and transferred to the monitor analyzer. The list 65 shows the details of packets collected from the LAN-to-LAN connector 1. In the list 65, a reference mark "a" indicates extracted data converted into hexadecimal (HEX) codes from binary codes. The data shown corresponds to the contents of the third frame among 300 frames. It is hard to understand the hexadecimal codes, so that they are analyzed and arranged in summaries, reception time (REC TIME), destinations (DST), sources (SRC), and reception LAN interface names (REC LS) as indicated with "c" in 65. A result of analysis of the packet data is displayed as detailed information (DETAIL) indicated with "b" in FIG. 12. The packet data and protocols, if required, are analyzed by a known analysis technique, and the result is displayed as shown in FIG. 12.

The present invention monitors LANs and analyzes faults in the LANs at low cost by only by adding a simple arrangement to an existing system. The present invention monitors and analyzes LANs with remote commands passed through the LANs, so that a fault may be quickly monitored without connecting LAN analyzers and child units to the LANs.

The present invention copies a LAN packet through a routing process in a LAN-to-LAN connector irrelevant to physical interfaces, so that the present invention is capable of monitoring packets of wide area networks (WANs) and high-speed LANs such as FDDIs.

The present invention is realized by adding functions to LAN-to-LAN connectors. Accordingly, the number of apparatuses to which the functions are added is smaller than the number of LANs to be monitored, and therefore, the present invention is realized at low cost compared with the prior art that arranges a LAN analyzer for each LAN.

We claim:

1. A method of monitoring and fault-analyzing a network including a plurality of LANs, comprising the steps of:

sending a command from an optional terminal connected to an optional one of the LANs to LAN-to-LAN connectors, for copying a packet having a terminal address to be monitored and transferring the copy packet to a specified apparatus;

causing each of the LAN-to-LAN connectors receive the transfer command, detect packets each having the specified address among packets received at a LAN interface thereof, copy the packets, store the copied packets in a storage unit, and transfer the stored data to the specified apparatus, collecting and monitoring the data transferred from the LAN-to-LAN connectors at the specified apparatus; and adding, in each of the LAN-to-LAN connectors, the reception time of each copy packet and information of the LAN interface to the copy packet and storing the information-added copied packet in the storage unit.

2. The method according to claim 1, comprising the steps of including a monitor time and the number of packets to be collected in the command from the optional terminal so that each of the LAN-to-LAN connectors may transfer the stored data to the specified apparatus when the monitoring time elapses, or when the specified number of packets are stored.

3. The method according to claim 1, comprising the step of employing a LAN fault analyzer as a specified apparatus, to analyze a communication fault between monitored terminals according to the collected data.

4. The method according to claim 1, wherein a data flow of a wide area network (WAN) can be easily monitored or collected.

5. A LAN-to-LAN connector used for achieving the method of claim 1, comprising means for holding the command from the terminal, means for determining whether or not a received packet has the specified address and copying the packet if it has the specified address, means for adding information such as the time of reception to the copied packet and storing the information-added copied packet in a storage unit, and means for transferring the contents of the storage unit to the specified apparatus when the specified time elapses, or when the specified number of packets are stored in the storage unit.

6. A terminal used for achieving the method of claim 1, comprising a LAN monitor connected to an optional LAN, a LAN fault analyzer, or an ordinary terminal, and a man-machine interface including a menu for setting the address of a packet to be collected and a collection time or the number of packets to be collected, and a menu for setting a file to be transferred and a transfer destination, the set information being sent as a command to the LAN-to-LAN connectors.

* * * * *